United States Patent [19]

Flecha et al.

[11] Patent Number: 5,801,381
[45] Date of Patent: Sep. 1, 1998

[54] METHOD FOR PROTECTING A PROBE TIP USING ACTIVE LATERAL SCANNING CONTROL

[75] Inventors: Edwin Flecha; Kenneth Gilbert Roessler, both of Boca Raton, Fla.; Robert Marshall Stowell, West Linn, Oreg.

[73] Assignee: International Business Machines Corporation, Armonk, N.Y.

[21] Appl. No.: 861,118

[22] Filed: May 21, 1997

[51] Int. Cl.[6] ..................................................... H01J 37/26
[52] U.S. Cl. ................................................ 250/306; 250/307
[58] Field of Search ................................. 250/306, 307; 73/105

[56] References Cited

U.S. PATENT DOCUMENTS

| | | | |
|---|---|---|---|
| 4,343,993 | 8/1982 | Binning et al. | 250/306 |
| 4,724,318 | 2/1988 | Binning | 250/306 |
| 4,902,892 | 2/1990 | Okayama et al. | 250/306 |
| 4,987,303 | 1/1991 | Takase et al. | 250/306 |
| 5,162,653 | 11/1992 | Hosaka et al. | 250/306 |
| 5,186,041 | 2/1993 | Nyyssonen | 73/105 |
| 5,260,572 | 11/1993 | Marshall | 250/306 |
| 5,321,977 | 6/1994 | Clabes et al. | 73/105 |
| 5,329,808 | 7/1994 | Elings et al. | 250/307 |
| 5,345,816 | 9/1994 | Clabes et al. | 73/105 |
| 5,347,854 | 9/1994 | Martin et al. | 73/105 |
| 5,414,690 | 5/1995 | Shido et al. | 369/126 |
| 5,415,027 | 5/1995 | Elings et al. | 73/105 |
| 5,418,363 | 5/1995 | Elings et al. | 250/306 |
| 5,436,448 | 7/1995 | Hosaka et al. | 250/306 |
| 5,519,212 | 5/1996 | Elings et al. | 250/306 |

FOREIGN PATENT DOCUMENTS

| | | |
|---|---|---|
| 3-180702 | 8/1991 | Japan . |
| 4-318404 | 11/1992 | Japan . |

OTHER PUBLICATIONS

*IBM Technical Disclosure Bulletin*, Microprobe–Based Measurement Tool, vol. 32, No. 7, Dec. 1989, p. 168.
*IBM Technical Disclosure Bulletin*, Fast Image Acquisition with Scanning Tunneling Microscope or Atomic Force Microscope, vol. 36, No. 03, Mar., 1993, p. 93.

*Primary Examiner*—Kiet T. Nguyen
*Attorney, Agent, or Firm*—Richard A. Tomlin; Ronald V. Davidge

[57] ABSTRACT

A scanning probe microscope includes a detection mechanism producing a feedback signal indicating a condition of engagement between the scanning probe and the surface of a sample being examined. When this engagement is above a threshold level, the lateral scanning movement between the probe and sample is stopped. The scanning movement occurs in incremental movements, and a feedback signal above the threshold level indicates that, if the scanning movement were to continue, the probe could not be moved upward fast enough to prevent a crash condition between the probe and the sample surface. The scanning movement is not re-started until the feedback signal indicates that the probe has been moved far enough away from the sample surface that such a crash condition can be avoided during the next incremental movement.

17 Claims, 2 Drawing Sheets

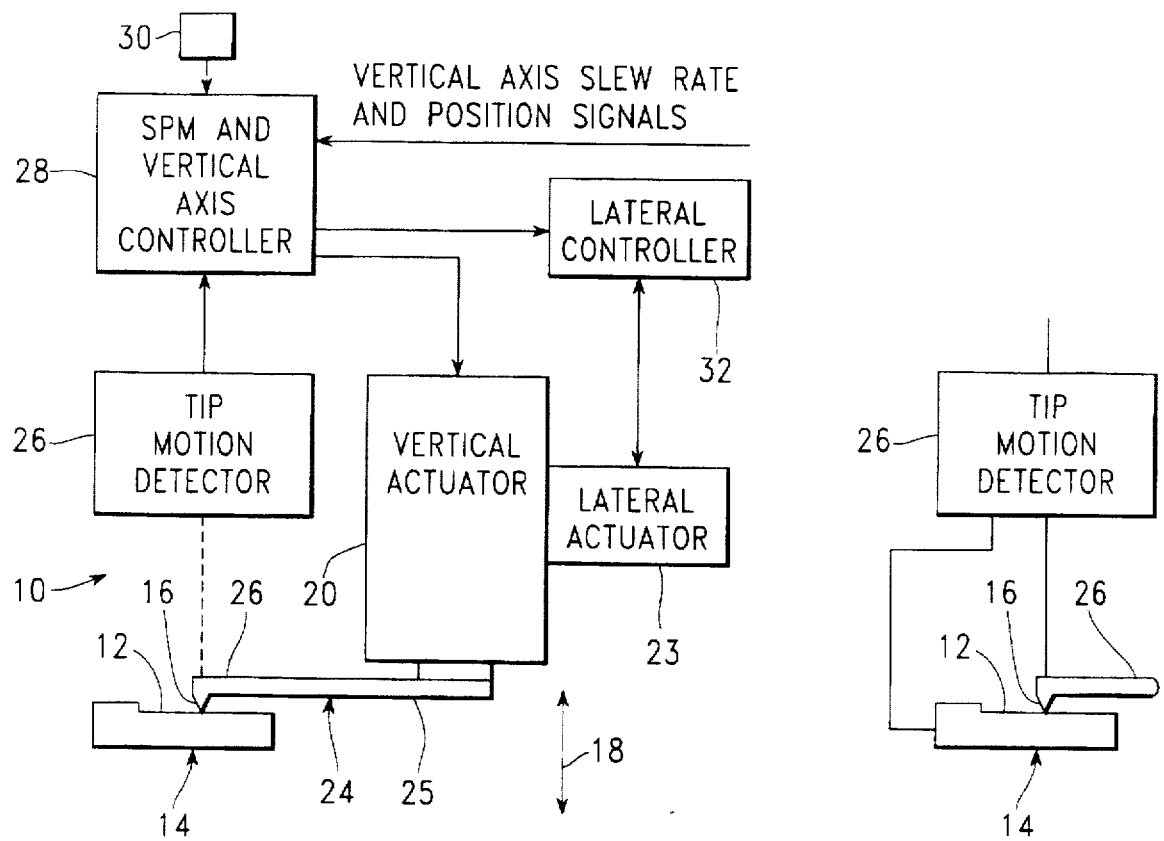
FIG. 1.
FIG. 4.
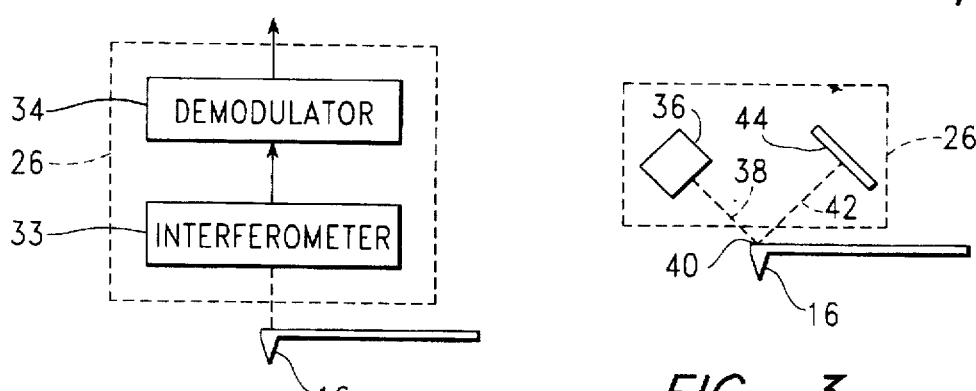
FIG. 2.
FIG. 3.

1

METHOD FOR PROTECTING A PROBE TIP USING ACTIVE LATERAL SCANNING CONTROL

BACKGROUND OF THE INVENTION

1. Field of the Invention

This invention relates to a method for protecting the probe tip of a scanning probe microscope from potential damage by being driven laterally into an upstanding structure on the surface of a sample, and, more particularly, to a method providing such protection by stopping lateral motion of the probe when such a structure is encountered.

2. Background Information

In the conventional operation of a scanning probe microscope, lateral movement of the probe, or of the sample relative to the probe, is performed according to a predetermined motion profile, which is usually in the form of a sinusoidal or sawtooth curve. This lateral motion is often provided as an input to the device in the form of a frequency, expressed in Hertz, with data points being taken at a constant rate, even when the drive moving the probe in a vertical direction cannot keep up with changes in the elevation of the surface of the sample being measured. This type of operation can lead to damage to the probe and to the sample due to a "crash" condition occurring therebetween and to a degradation of measurement accuracy whenever vertical movement cannot keep up with such changes.

What is needed is a way to prevent the occurrence of such a "crash" condition by stopping lateral motion upon the detection of a steep rise in surface profile, thereby giving the vertical actuator time to move the probe upward before resuming lateral motion.

DESCRIPTION OF THE PRIOR ART

The patent art includes a number of patents, such as U.S. Pat. Nos. 4,343,993 and 4,724,318, describing scanning probe microscope technologies in which the present invention can be applied.

U.S. Pat. No. 4,343,993 describes a scanning tunneling microscope, in which a very sharp metal tip is raster-scanned across a surface to be inspected at a distance so small that the electron clouds of the atoms at the apex of the tip and on the surface area closest to the tip gently touch. A so-called tunnel current then flows across the gap, provided a potential difference exists between the tip and the surface. Since this tunnel current is exponentially dependent on the distance between the tip and the surface, a correction signal is generated, based on deviations from a predetermined value occurring as the tip is scanned across the surface of the sample. The correction signal is used to control the tunnel distance so as to minimize the correction signal, and to be plotted versus a position signal derived from the physical position of the tip over the surface being inspected. This technique permits a resolution down to an atomic scale, so that individual atoms on the surface can be made visible.

U.S. Pat. No. 4,724,318 describes an atomic force microscope, in which a sharp point is brought so close to the surface of a sample to be investigated that the forces occurring between the atoms as the apex of the point and those at the surface cause a spring-like cantilever to deflect. The cantilever forms one electrode of a tunneling microscope, the other electrode being a sharp tip. The deflection of the cantilever provokes a variation of the tunnel current, and that variation is used to generate a correction signal which can be employed to control the distance between the point and the sample, in order, for example, to maintain the force between them constant as the point is scanned across the surface of the sample by means of an xyz-drive, with the sample being driven in a raster scan in the xy-plane. In certain modes of operation, either the sample or the cantilever may be excited to oscillate in the z-direction. If the oscillation is at the resonance frequency of the cantilever, the resolution is enhanced. Using this method, a topographical image of a sample surface having a resolution better than 100 nanometers may be obtained by employing the following steps: A sharp point which is fixed to one end of a spring-like cantilever is brought so close to the surface of the sample that the forces occurring between the point and the sample surface are larger than $10^{-20}$ Newton, so that the resulting force deflects the cantilever. The deflection of the cantilever is detected by means of a tunnel tip disposed adjacent the cantilever. The tunnel current then flowing across the gap between the cantilever and tunnel tip is maintained at a constant value by using any detected variations of the tunnel current to generate a correction signal. The correction signal is used, among other things, to maintain the point-to-sample distance constant.

Other examples from the patent art provide methods for stopping or varying the scanning motion of the probe of a scanning probe microscope in response to detected variations in the topography of the sample surface.

For example, U.S. Pat. No. 5,186,041 describes a metrology system configured particularly for determining the depth and width of a trench within a sample to be tested, through the use of a system providing output signals indicating both the vertical and transverse relationship of the sample to the probe and adjusting the vertical and transverse relationships of the probe and sample as a function of these signals. The probe has three protuberances to detect the depth and width of the trench. One protuberance extends down to sense the bottom of the trench. Lateral protuberances extend in opposite directions, across the width of the trench, from the probe to detect the side walls of the trench. Forces on the protuberances are measured to determine the depth and the location of the side walls of the trench.

In another example, U.S. Pat. No. 5,345,816 describes the use of an integrated tip strain sensor in combination with a single axis atomic force microscope for determining the profile of a surface in three directions. A cantilever beam carries an integrated tip stem on which is deposited a piezoelectric film strain sensor with four superimposed elements, which function in a plane perpendicular to that of the probe. Three-dimensional metrology is performed while catastrophic tip "crashes" with high extended features of the sample surface, such as sidewalls, are avoided. The potential for a tip "crash" is detected by the electrical signal output from the strain sensor exceeding a predetermined threshold. When the threshold is exceeded, the feedback control system stops the movement of the tip and then backs the tip away from a surface feature with which it has come into contact.

What is needed is a method for stopping or varying the scanning motion upon the detection of topographical variations in the sample surface without the complexity of a second system for causing and detecting tip motion, as required in U.S. Pat. No. 5,186,041, and without the complexity of an integrated system of strain sensors, as required in U.S. Pat. No. 5,345,816.

Japanese Patent Kokai No. 3-180702 describes a scan speed control method for a scanning tunnel microscope. This method controls the scanning mechanism in relation to a value obtained by differentiating vertical probe displacement. In this way, the scanning speed is reduced as the probe is moved over a bump. In this device, the tunneling current is measured, amplified, and linearized, overcoming the logarithmic characteristics of the tunneling current signal to generate an error signal. The error signal, which drives a piezoelectric actuator in a direction perpendicular to the sample surface, corresponds to a time differential value of probe displacement in the perpendicular direction. A corrected lateral scanning speed is calculated as being equal to pre-determined scanning speed data divided by the product of a correction coefficient and time differential data. Sample data is taken as sample signal pulses are emitted at intervals along the lateral scanning movement, with lateral movement occurring with variation in the scanned signal, and with such intervals being defined as the maximum value of the scanned signal divided by the number of desired sample points. Thus, the positions at which samples are made does not vary with changes in probe elevation and scanning speed.

What is needed is a method for varying the lateral scanning velocity in accordance with data derived in a more flexible manner. For example, data collected more often than at the sampling intervals could be used to provide greater sensitivity to rapid changes in the profile of the sample surface. Furthermore, for particularly high upward-extending features, what is needed is a method to stop the scanning motion until the probe tip has been moved sufficiently away from the surface of the sample, with the forward motion being re-started only when this motion away from the surface of the sample has been completed. Also, the complexity of taking and evaluating data samples would be simplified if a method were provided allowing operation of the device at a constant scanning speed except when it becomes necessary to accommodate a change in local height of the sample.

SUMMARY OF THE INVENTION

It is a first objective of the present invention to provide a method for preventing the occurrence of crash conditions between the probe tip of a scanning probe microscope and the surface of a sample being inspected.

It is a second objective of the present invention to provide such a method through the detection of topographical features with a feedback or correction signal required for other operations of the scanning probe microscope, without requiring the use of additional measurement devices or systems.

It is a third objective of the present invention to provide a means stopping lateral scanning motion of a scanning probe when an upstanding topographical feature is encountered, if the rate of rise of this feature cannot be accommodated by the fastest rate at which the probe tip can be moved out of contact with the sample surface during scanning at a normal rate.

It is a fourth objective of the present invention to provide a means for re-starting scanning movement only after the probe tip has been moved away from the sample through a distance allowing subsequent movement of the probe tip further out of contact with the surface during scanning of the sample at a normal rate.

In is a fifth objective of the present invention to allow operation of the scanning probe microscope without varying the speed of lateral scanning, except when it is necessary to stop such scanning to provide time for vertical motion of the probe.

According to one aspect of the present invention, there is provided a method for controlling relative lateral movement between a scanning microscope probe tip and a sample surface, with the relative lateral movement occurring in a direction perpendicular to the sample surface by means of a lateral actuator, wherein the method comprises steps of:

a) developing a feedback signal indicating a level of movement, in a first direction perpendicular to the sample surface, required to satisfy a pre-determined condition of engagement between the probe tip and the sample surface;

b) comparing the feedback signal with a stored threshold value, wherein the stored threshold value corresponds to a maximum distance through which the probe tip can be driven in the first direction away from the sample surface during an incremental portion of the relative lateral movement;

c) moving the probe tip in the first direction in accordance with the feedback signal;

d) driving the lateral actuator through the incremental portion only if the feedback signal is less than the stored threshold value, as determined in the step b); and e) returning to the step a).

According to another aspect of the present invention, there is provided apparatus for determining topographical features of a sample surface by traversing the surface with a scanning probe tip. The apparatus includes a vertical actuator, a lateral actuator, a detection circuit, a vertical drive circuit, a first signal processing circuit, and a lateral drive circuit. The vertical actuator moves the probe tip in a first direction perpendicular to the surface of the sample. The lateral actuator generates relative motion between the probe tip and the sample surface, in a lateral direction parallel to the sample surface along a scan path in a number of incremental movements occurring at a pre-determined velocity. The detection circuit generates a feedback signal indicating a level of engagement between the probe tip and the sample surface. The vertical drive circuit generates a vertical drive signal to operate the vertical actuator in accordance with the feedback signal, so that a pre-determined level of engagement is maintained between the probe tip and the sample surface. The first signal processing circuit compares the feedback signal with a threshold value for this signal, with the threshold value representing a pre-determined maximum level of engagement between the probe tip and the sample surface. The lateral drive circuit generates a lateral drive signal operating the lateral actuator to generate the relative motion, with this relative motion occurring only when the first signal processing circuit indicates that the feedback signal is below the threshold value.

BRIEF DESCRIPTION OF THE DRAWINGS

FIG. 1 is a schematic view of a scanning probe microscope in which the present invention is applied;

FIG. 2 is a schematic view of a tip motion detector in a non-contact atomic force version of the microscope of FIG. 1;

FIG. 3 is a schematic view of a tip motion detector in a contact atomic force version of the microscope of FIG. 1;

FIG. 4 is a schematic view of a tip motion detector in a scanning tunneling version of the microscope of FIG. 1;

DESCRIPTION OF THE INVENTION

Figure 5:
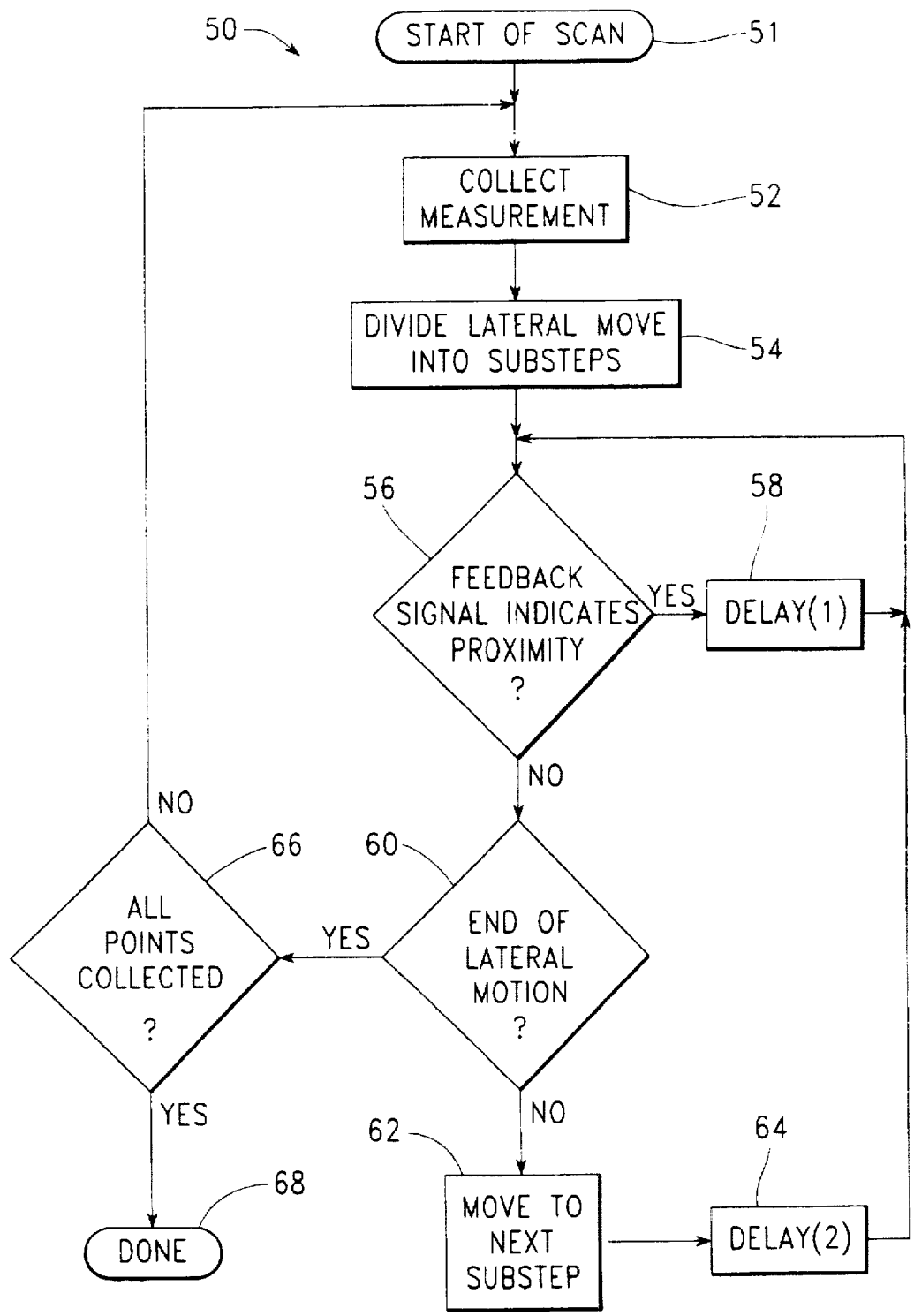
FIG. 5 is a flow diagram of a process occurring within the microscope of FIG. 1 in accordance with the present invention.

FIG. 1 is a general schematic view of a scanning probe microscope 10, in which the present invention is employed.

for examining a surface 12 of a sample 14 by means of a sharply pointed scanning probe tip 16. As the sample 14 is held stationary, the probe tip 16 is moved vertically, in the directions of arrow 18, by a vertical actuator 20, which is in turn moved horizontally, in the directions of arrow 22, by means of a lateral actuator 23. The probe tip 16 is connected to the vertical actuator 20 by a coupling member 24 having a proximal end 25 fastened to the actuator 20 and a distal end 26 fastened to the probe tip 16. The vertical directions of arrow 22 are substantially perpendicular to the sample surface 12.

During the examination of the sample surface 12, the lateral actuator 23 is generally operated to move the probe tip 16 in a sawtooth or raster pattern over the surface 12, so that this surface is thoroughly and systematically traversed. The probe tip 16 is held in engagement with the surface 12, during this lateral movement, and is in fact moved by the vertical directions of arrow 18 to follow the topographical features of the sample surface 12 by means of a servomechanism using a feedback signal developed within a detector 26. This signal is applied as an input to a controller 28 which controls operation of the scanning probe microscope 10 in general and vertical movement of the probe 16 through the vertical actuator 20 in particular. The controller 28 is executing a computer program including various routines for control of the microscope 10. This program has been loaded into memory structures within the controller 28 from a computer readable medium, such as one or more magnetically recorded disks 30. The controller 28 also provides signals operating a lateral controller, which drives the lateral actuator 32.

While this configuration shows the probe tip 16 being moved in both the vertical and scanning directions, it is understood that either or both of the movements could alternately be made by moving the sample 14, within the scope of the present invention.

The various elements of the scanning probe microscope 10 may be configured to apply one of a number of different technologies to the problem of determining the topography of the sample surface 12. For example, if the scanning probe microscope 10 is an atomic force microscope, the coupling member 24 is a flexible cantilever, and the microscope 10 is operated to provide a constant normal force between the sample surface 12 and the probe tip 16 as a constant level of deflection is maintained in the cantilever.

If the atomic force microscope is of a non-contact type, the vertical axis controller 28 applies a vibration excitation signal at a pre-determined frequency to vertical actuator 20, causing the proximal end 25 of the coupling member 24 to vibrate in the directions of arrow 18. This pre-determined frequency is preferably at or near the resonant frequency of the coupling member 24, with this frequency being typically between 100 KHz and 1 MHz. As the sample surface 12 is traversed by laterally moving the probe tip 16, the probe tip 16 is moved so close to the surface 12 in the vertical direction that the Van der Walls forces between the surface 12 and tip 16 become pre-dominate factors controlling the vertical movement of the tip 16 with the vibration excitation occurring at the proximal end 25 of coupling member 24. The atomic force microscope is operated to maintain the amplitude of vibration at the pre-determined frequency of the probe tip 16 at a controlled level. As the probe tip 16 is moved away from the sample surface 12, the amplitude of probe tip vibration rises to a level occurring in free space. As the probe tip 16 is moved toward the sample surface 12, the amplitude of probe tip vibrations is decreased.

Thus, when the scanning probe microscope 10 is configured as a non-contact version of an atomic force microscope, the vertical actuator 20 is operated to maintain a controlled level of vibration of the probe tip 16 in a pre-determined frequency, as vibrations at a pre-determined amplitude and at this frequency are driven into the coupling element 24 at its proximal end 25 through the vertical actuator 20. In this implementation, the tip motion detector 26 is configured as a heterodyne laser interferometer coupled to a demodulator. The use of a heterodyne laser interferometer in this way is described in some detail in U.S. Pat. No. 5,186,041. While the device of this referenced patent splits the laser beam to measure deflections in two mutually-perpendicular directions, the present invention requires such measurements in only one direction.

FIG. 2 is a schematic view of the tip detector 26 of this implementation. An interferometric device 33 provides an intermediate signal indicating the movement of the probe tip 16, including its movement at the pre-determined frequency, to a modulator 34, which in turn provides the feedback signal input to controller 28 (shown in FIG. 1). Within the controller 28, a difference between this feedback signal and a setpoint level is calculated, and this difference is used to determine a voltage driving the vertical actuator 20.

On the other hand, if the atomic force microscope is of a contact type, vibration excitation is not applied through the vertical actuator 20. The tip motion detector 26 is a motion detector which produces a signal proportional to the movement of the probe tip 16.

FIG. 2 is a schematic view of the tip detector 26 used in the contact type atomic force microscope. A laser source 36 directs a laser beam 38 at an oblique angle of incidence toward a reflective surface 40 moving with the probe tip 16. The reflection 42 of the laser beam 38 is directed toward a linear array 44 of photosensitive elements. Vertical movement of the reflective surface 40, in the directions of arrow 18, moves the reflected beam 42 along an array 44, so that the position of the illuminated element within the array 44 indicates the vertical position of the probe tip 16. In this type of system, the feedback signal is determined within the controller 28 by subtracting a signal indicating the vertical position of the probe 16 from the voltage signal driving the vertical actuator 20, since this voltage signal provides an indication of the position of the proximal end 25 of the coupling member 24.

Referring again to FIG. 1, the scanning probe microscope 10 may alternately be configured as a scanning tunneling microscope, using the measurement technology described in detail in U.S. Pat. No. 4,343,993. In this version of the apparatus, the coupling member 24 is electrically insulating and is quite stiff, so that the deflection of the proximal end 25 of the coupling member determines the position of the probe tip 16.

FIG. 4 is a schematic view of the probe tip detector 26 used in the scanning tunneling microscope version of the apparatus of FIG. 1. In this version, the probe tip detector 26, which includes a first electrical connection to the sample 14 and a second electrical connection to the probe tip 16, is used to measure a tunneling current flowing between the sample 14 and the probe tip 16. The output of the tip detector is a feedback signal representing the value of this tunneling current. Within the controller 28 (shown in FIG. 1) a setpoint value is subtracted from the value of tunneling current given as the feedback signal, and the program executing within the controller 28 causes the vertical actuator 20 to be driven so that the microscope 10 operates at a constant level of tunneling current.

Referring again to FIG. 1, thus, the vertical actuator 20 is used to move the probe tip 16 upward in response to a feedback signal indicating a local increase in height of the sample surface 12. Such a signal may be a decrease in the vibration amplitude of probe tip 16, an upward movement of the probe tip 16, or an increase in tunneling current flowing between the sample 14 and the probe tip 16. Conversely, the vertical actuator 20 is also used to move the probe tip 16 downward by indicating a local decrease in height of the sample surface 12. Such a signal may be an increase in the vibration amplitude of probe tip 16, a downward movement of the probe tip 16, or a decrease in tunneling current flowing between the sample 14 and the probe tip 16.

In the operation of a conventional scanning probe microscope, a particular problem occurs as the probe tip 16 is driven toward a step increase 46 in the height of sample surface 12. As the probe tip approaches the step increase, the feedback signal described above indicates that the probe should be lifted. However, the maximum slew rate of the vertical actuator 20 is often too slow to lift the probe tip 16 fast enough to avoid hard lateral contact between the step increase 46 and the probe tip 16. Since, in a conventional scanning probe microscope, the rate of lateral movement of the scanning probe is not changed when a step increase is encountered, a "crash" occurs between the probe 16 and the step increase 46. Such a crash is likely to damage both the probe tip 16 and the sample 14.

FIG. 5 is a flow chart describing processes controlling operation of the scanning probe microscope 10 in accordance with the present invention to prevent the occurance of a crash with continued lateral motion when the probe 16 cannot be lifted fast enough to accommodate a change in vertical height of the sample surface 12, due to limitations of the slew rate of vertical actuator 20.

Referring to FIGS. 1 and 5, FIG. 5 shows the results of executing a subroutine 50 in controller 28 to control the movements of the scanning probe microscope 10 during a single lateral scan, occurring as the sample 14 is moved using the lateral actuator 23. This subroutine 50 has been loaded into the controller 28 by means of one or more disks 30 including encoded information. A single scan generally includes a first number of defined points, at which height measurements are reported to another routine. Between adjacent such points, a number of substeps provide places at which action can be taken by the subroutine.

The subroutine 50 of FIG. 5 begins in block 51 with the start of an individual scan. Next, in block 52, the measurement data is collected and transferred to another subroutine, which conditions the data for output by transmission, display, or storage. At this point, the lateral motion data is derived from the voltages used to drive two piezoelectric actuator stages, generally called X- and Y-stages, within the lateral actuator 23. The vertical motion data is similarly derived from the voltage used to drive a single piezoelectric actuator, the vertical actuator 20. Then, in block 54, the lateral motion of probe tip 16 is divided into a number of substeps, so this probe motion can be stopped at an intermediate point following each substep.

Next, in block 56, a determination is made of whether the vertical signal, which has been determined from the voltage to vertical actuator 20, indicates proximity. This determination is based on comparing the vertical movement called for by the feedback signal output of the tip detector 26 with the vertical movement which can occur during lateral movement through the next substep at a pre-determined scanning velocity achieved through the use of the lateral actuator 23. It is desirable, but not necessary, that all of the substeps should be equal in length to simplify this determination.

If the scanning probe microscope 10 is a non-contact atomic force type, a decrease in vibration to a level below a pre-determined threshold indicates that, in the sense of block 56, "proximity" has occurred, since in order to clear an upstanding feature with continued movement at the pre-determined scanning velocity at which lateral motion occurs through the use of lateral actuator 23, the probe tip 16 must be moved upward through a distance greater than that which can be achieved using the slew rate of the vertical actuator 20.

If the scanning probe microscope 10 is a contact atomic force type, an increase in the difference between the feedback signal from the output of tip motion detector 26 and the position signal derived from the voltage driving vertical actuator above a pre-determined threshold indicates that, "proximity" has occurred, since in order to clear an upstanding feature with continued movement at the pre-determined scanning velocity through the next substep, the probe tip must be moved upward through a distance greater than which can be achieved using the slew rate of vertical actuator 20.

If the scanning probe microscope 10 is a scanning tunneling probe type, an increase in tunneling current above a pre-determined threshold level indicates that "proximity" has occurred, since in order to clear an upstanding feature with continued movement at the pre-determined scanning velocity through the next substep, the probe tip must be moved upward through a distance greater than that which can be achieved using the slew rate of the vertical actuator 20.

In any case, if the determination is made in block 56 that proximity has occurred, the subroutine 50 proceeds through a first delay in block 58. During this delay, the vertical actuator 20 is operated under normal control in response to the feedback signal provided as an output of tip motion detector 26. The subroutine 50 the returns to block 58, where another determination is made of whether the feedback signal still indicates "priority." If a particularly high upstanding feature is encountered, two or more passes through blocks 56, 58 may be needed before the next substep occurs.

When the feedback signal does not indicate that proximity has occurred, the subroutine 50 proceeds to block 60, where a determination is made of whether an end of the lateral motion needed in the scan has occurred. If the probe tip 16 is not at this end of lateral motion, the probe tip is moved laterally, by means of lateral motion actuator 23 to the next substep as the subroutine passes through block 62. Then a second delay is encountered in block 64, as the feedback signal is read. The system returns to block 56, where it is again determined whether the feedback signal indicates "proximity."

On the other hand, if a determination is made in block 60 that the end of lateral motion in the scan has been reached, the subroutine 50 proceeds to block 66, where a determination is made of whether all points have been collected, i.e. if the data from all points within the scan has been sent to another subroutine for display, transmission, or storage . If they have all been collected, the subroutine 50 is finished, so it ends in block 68. If they have not all been collected, the subroutine 50 returns to block 52, where the next data point is collected.

The subroutine 50 operates in a fashion preventing crashes of the probe tip 16 with upstanding features 46 of the sample surface 12 by stopping the lateral, or scanning, movement of the probe tip 16 when such an upstanding feature 46 is detected through the normal detection means of the scanning probe microscope 10. Thus, the present invention has an advantage over the devices described in U.S. Pat. Nos. 5,186,401 and 5,345,816 in that the complexity of an additional system of probe strain gages to detect lateral movement, or an entire system for detecting lateral movement with an interferometer, is not required.

The scanning movement occurs in a number of incremental movements, and the mechanism stopping such lateral movement is triggered when the feedback signal exceeds a threshold value indicating that the probe tip 16 cannot be moved away from the sample fast enough during the next scanning movement. When this mechanism is not triggered lateral scanning occurs at a pre-determined velocity, simplifying the method of taking and analyzing data samples, when compared to the method of Japanese Patent Kokai No. 3-180702, in which the samples are taken at a rate varying with the slope of the sample surface. The scanning movement of the present invention remains stopped as long as necessary to move the probe away from the sample far enough to clear an upstanding feature. In the present invention, the measurements needed for triggering this mechanism can occur many times between the sampling of data to be provided as an output of the system. In this way, the present invention gains an advantage over the method of Japanese Patent Kokai No. 3-180702 relative to an ability to react to abrupt changes in sample surface elevation.

While the invention has been described in its preferred forms of embodiments with some degree of particularity, it is understood that this description has been given only by way of example and that numerous changes in the detail of construction, fabrication, and use, including the combination and arrangement of parts, may be made without departing from the spirit and scope of this invention.

What is claimed is:

1. A method for controlling relative lateral movement between a scanning microscope probe tip and a sample surface, with said relative lateral movement occurring in a direction perpendicular to said sample surface by means of a lateral actuator, wherein said method comprises steps of:
   a) developing a feedback signal indicating a level of movement, in a first direction perpendicular to said sample surface, required to satisfy a pre-determined condition of engagement between said probe tip and said sample surface;
   b) comparing said feedback signal with a stored threshold value, wherein said stored threshold value corresponds to a maximum distance through which said probe tip can be driven in said first direction away from said sample surface during an incremental portion of said relative lateral movement;
   c) moving said probe tip in said first direction in accordance with said feedback signal;
   d) driving said lateral actuator through said incremental portion only if said feedback signal is less than said stored threshold value, as determined in said step b); and
   e) returning to said step a).

2. The method of claim 1, wherein
   said relative lateral movement occurs along a scan path including a first plurality of measurement points at which positional data describing positions of said probe tip are collected, and
   a second plurality of substeps lies along said scan path between adjacent said measurement points, with said steps a) through e) occurring between movements through each substep within said second plurality thereof.

3. The method of claim 2, wherein
   said step a) is preceded by steps of:
      f) starting operation of a subroutine controlling said relative lateral movement along said scan path; and
      g) collecting said positional data, and
   said step b) is followed by steps of:
      h) determining whether said relative lateral movement has been completed, proceeding to said step c) if said lateral movement has not been completed, and proceeding to determine if said positional data has been collected at all said measurement points in said first plurality thereof if said lateral movement has been completed; and
      i) ending said subroutine if said positional data has been collected at all said measurement points in said first plurality thereof, and otherwise returning to said step g).

4. The method of claim 3, wherein said step g) is preceded by dividing said scan path into said second plurality of substeps between said adjacent measurement points.

5. Apparatus for determining topographical features of a sample surface by traversing said sample surface with a scanning probe tip, wherein said apparatus comprises:
   a vertical actuator moving said probe tip in a first direction perpendicular to said sample surface;
   a lateral actuator generating relative motion between said probe tip and said sample surface in a lateral direction parallel to said sample surface along a scan path in a number of incremental movements occurring at a pre-determined velocity;
   detection means for generating a feedback signal indicating a level of engagement between said probe tip and said sample surface;
   vertical drive means generating a vertical drive signal to operate said vertical actuator in accordance with said feedback signal so that a pre-determined level of engagement is maintained between said probe tip and said sample surface;
   first signal processing means comparing said feedback signal with a threshold value therefor, with said threshold value representing a pre-determined maximum level of engagement between said probe tip and said sample surface; and
   lateral drive means generating a lateral drive signal operating said lateral actuator to generate said relative motion, with said relative motion occurring only when said first signal processing means indicates that said feedback signal is below said threshold value.

6. The apparatus of claim 5, wherein
   said probe tip is connected to said vertical actuator by means of a flexible coupling,
   said vertical drive means includes a vibration excitation driver operating said vertical actuator at a pre-determined frequency to cause resonance within said flexible coupling, and
   said detection means includes interferometric means for determining movement of said probe tip and a demodulator receiving data from said interferometric means, with said demodulator providing an amplitude of vibration of said probe tip at said pre-determined frequency as said feedback signal.

7. The apparatus of claim 5, wherein
   said probe tip is connected to said vertical actuator by means of a flexible coupling, and
   said detection means includes:

a laser directing a beam at a reflective surface moving with said probe tip, an array of photosensitive elements, with a reflection of said beam off said reflective surface being directed at said array of photosensitive elements, with movement of said probe tip in said first direction moving said reflection along said array of photosensitive elements, and with a position signal being generated according to which of said photosensitive elements are illuminated by said reflection; and second signal processing means forming said feedback signal as a difference between said position signal and a signal indicating a position of said vertical actuator.

8. The apparatus of claim 5, wherein said probe tip is connected to said vertical actuator by means of an electrically insulating coupling, and said detection means includes a circuit detecting a tunneling current flowing between said sample surface and said probe tip, with said feedback signal being generated according to said tunneling current.

9. The apparatus of claim 5, wherein said apparatus additionally comprises output means transmitting data describing positions of said vertical and lateral actuators at a number of measurement points along said scan path, with a plurality of incremental movements occurring between adjacent said measurement points on said scan path.

10. A method for determining topographical features of a sample surface by traversing said sample surface with a scanning probe tip, wherein said method comprises steps of:

(a) moving said scanning probe tip into contact with said sample surface in a first direction perpendicular to said sample surface, generating a feedback single indicate a level of engagement between said scanning probe tip and said sample surface, with said scanning probe tip being moved into a level of engagement corresponding to a pre-determined level of said feedback signal; and (b) generating relative motion between said scanning probe tip and said sample surface in a lateral direction parallel to said sample surface, with said feedback signal being generated at positioning intervals, with said scanning probe tip being moved in incremental motions occurring at said positioning intervals in said first direction in accordance with said feedback signal to restore said predetermined level of said feedback signal, with said relative motion being stopped when said feedback signal is beyond a threshold level indicating excessive engagement between said scanning probe tip and said sample surface, and with said relative motion being started again when said feedback signal is within said threshold level.

11. The method of claim 10, wherein data describing a location of an actuator moving said scanning probe in said first direction and data describing a location of an actuator generating said relative motion are collected at measurement intervals, with a plurality of said positioning intervals occurring between sequential said measurement intervals.

12. A computer-readable medium with coded information recorded thereon to cause a computing system to execute a subroutine, wherein said computing system controls lateral movement within a scanning probe microscope, with said lateral movement occurring as relative motion between a probe tip and a sample surface being investigated in a direction parallel to said sample surface, with engagement between said probe tip and said sample surface being determined by movement of said probe tip in a first direction perpendicular to said sample surface, with a feedback signal being generated to indicate a level of engagement between said probe tip and said sample surface, and with said subroutine including steps of:

a) comparing said feedback signal with a stored threshold value, with said threshold value corresponding to a maximum distance through which said probe tip can be driven in said first direction away from said sample surface during an incremental portion of relative movement between said probe tip and said sample surface in a lateral direction perpendicular to said first direction;

b) driving a lateral actuator to cause said lateral motion through said increment only if said feedback signal is less than said threshold value, as determined in said step a); and c) returning to said step a).

13. The medium of claim 12, wherein said relative lateral movement occurs along a scan path including a first plurality of measurement points at which positional data describing positions of said probe tip are collected, a second plurality of substeps lies along said scan path between adjacent said measurement points, with said steps a) through e) occurring between movements through each substep within said second plurality thereof, said step a) is preceded by steps of:

f) starting operation of a subroutine controlling said relative lateral movement along said scan path; and g) collecting said positional data, and said step b) is followed by steps of:

h) determining whether said relative lateral movement has been completed, proceeding to said step c) if said lateral movement has not been completed, and proceeding to determine if said positional data has been collected at all said measurement points in said first plurality thereof if said lateral movement has been completed; and i) ending said subroutine if said positional data has been collected at all said measurement points in said first plurality thereof, and otherwise returning to said step g).

14. The method of claim 13, wherein said step g) is preceded by dividing said scan path into said second plurality of substeps between said adjacent measurement points.

15. A process controlled by a subroutine executing within a computing system, wherein said computing system controls lateral movement within a scanning probe microscope, with said lateral movement occurring as relative motion between a probe tip and a sample surface being investigated in a direction parallel to said sample surface, with engagement between said probe tip and said sample surface being determined by movement of said probe tip in a first direction perpendicular to said sample surface, with a feedback signal being generated to indicate a level of engagement between said probe tip and said sample surface, and wherein said subroutine includes steps of:

a) comparing said feedback signal with a stored threshold value, with said threshold value corresponding to a maximum distance through which said probe tip can be driven in said first direction away from said sample surface during an incremental portion of relative movement between said probe tip and said sample surface in a lateral direction perpendicular to said first direction;

b) driving a lateral actuator to cause said lateral motion through said increment only if said feedback signal is less than said threshold value, as determined in said step a); and c) returning to said step a).

16. The process of claim 15, wherein said relative lateral movement occurs along a scan path including a first plurality of measurement points at which positional data describing positions of said probe tip are collected, a second plurality of substeps lies along said scan path between adjacent said measurement points, with said steps a) through e) occurring between movements through each substep within said second plurality thereof, said step a) is preceded by steps of:
f) starting operation of a subroutine controlling said relative lateral movement along said scan path; and
g) collecting said positional data, and said step b) is followed by steps of:

h) determining whether said relative lateral movement has been completed, proceeding to said step c) if said lateral movement has not been completed, and proceeding to determine if said positional data has been collected at all said measurement points in said first plurality thereof if said lateral movement has been completed; and i) ending said subroutine if said positional data has been collected at all said measurement points in said first plurality thereof, and otherwise returning to said step g).

17. The method of claim 16, wherein said step g) is preceded by dividing said scan path into said second plurality of substeps between said adjacent measurement points.

* * * * *